United States Patent [19] // [11] 3,913,221
Muraoka et al. // [45] Oct. 21, 1975

[54] METHOD FOR PRODUCING A MULTICHANNEL MAGNETIC HEAD

[75] Inventors: Hiroshi Muraoka; Michinori Narui, both of Tokyo; Keiji Sugiyama, Tsuru, all of Japan

[73] Assignee: Pioneer Electronic Corporation, Tokyo, Japan

[22] Filed: Aug. 7, 1974

[21] Appl. No.: 495,467

[30] Foreign Application Priority Data

Aug. 7, 1973 Japan ........ 48-88643

[52] U.S. Cl. ........ 29/603; 360/124; 360/125
[51] Int. Cl.² ........ G11B 5/42
[58] Field of Search ........ 29/603; 360/124, 125–127

[56] References Cited

UNITED STATES PATENTS

| | | | |
|---|---|---|---|
| 3,037,885 | 6/1962 | Abolins | 29/603 |
| 3,400,386 | 9/1968 | Sinnott | 29/603 |
| 3,639,701 | 2/1972 | Secrist et al. | 29/603 |
| 3,768,154 | 10/1973 | Bol et al. | 29/603 |

*Primary Examiner*—Carl E. Hall
*Attorney, Agent, or Firm*—Sughrue, Rothwell, Mion, Zinn, & Macpeak

[57] ABSTRACT

A method for a producing multichannel magnetic head comprises the steps of disposing core elements, each having such a shape that the core has been cut along the gap surface, in such a manner that each of the same number of the gap forming surfaces as the number of the required channels are placed on the same plane, fixing each of the core elements on core holders so that the relative position between each of the core elements will not be changed so as to constitute a first core element assembly, constituting a second core element assembly having the same construction, maintaining said first and second core element assemblies with a predetermined relative position, and inserting a shield plate after the gap between each of the cores has been filled with a binder.

3 Claims, 3 Drawing Figures

METHOD FOR PRODUCING A MULTICHANNEL MAGNETIC HEAD

BACKGROUND OF THE INVENTION

1. Field of the Invention

The present invention relates to a method for producing a magnetic head, more particularly, to a method for producing a multichannel magnetic head used for various kinds of magnetic recording or reproducing devices.

2. Description of the Prior Art

Multichannel magnetic heads of the conventional type are produced, as shown in FIG. 1, by inserting core elements 11*a*, 11*b* which form a core 11 and a shield plate 12 which is located jointly between each of the cores 11 into notches 14 formed in a pair of core holders 13*a*, 13*b*, and by mutually assembling the core holders 13*a*, 13*b* in a predetermined relation. With this procedure, there is an advantage that the relative positional relation between the core elements 11*a*, 11*b* can easily be controlled by the core holders 13*a* and 13*b*, but since the dimensional accuracy of the positional relation is determined by the working accuracy of the core holders 13*a*, 13*b*, there is a drawback that the machining accuracy of the core holders 13*a*, 13*b* becomes difficult. Moreover, since complicated and accurate working is required, the material that can be used as the material for the core holders 13*a*, 13*b* is restricted. In general, a material which is favorable in workability is poor in anti-abrasive property, thus there may produce a remarkable difference in this property. In this case, the service life of the magnetic head is substantially reduced due to the roughness produced by the contact with the recording medium.

SUMMARY OF THE INVENTION

The object of the present invention is to provide a method for producing a multichannel magnetic head, according to which, it is possible to control the relative position of each of the core elements accurately without relying on the core holders, whereby the disadvantage of the above conventional method is eliminated.

DESCRIPTION OF THE PREFERRED EMBODIMENT

Figures 1, 2:
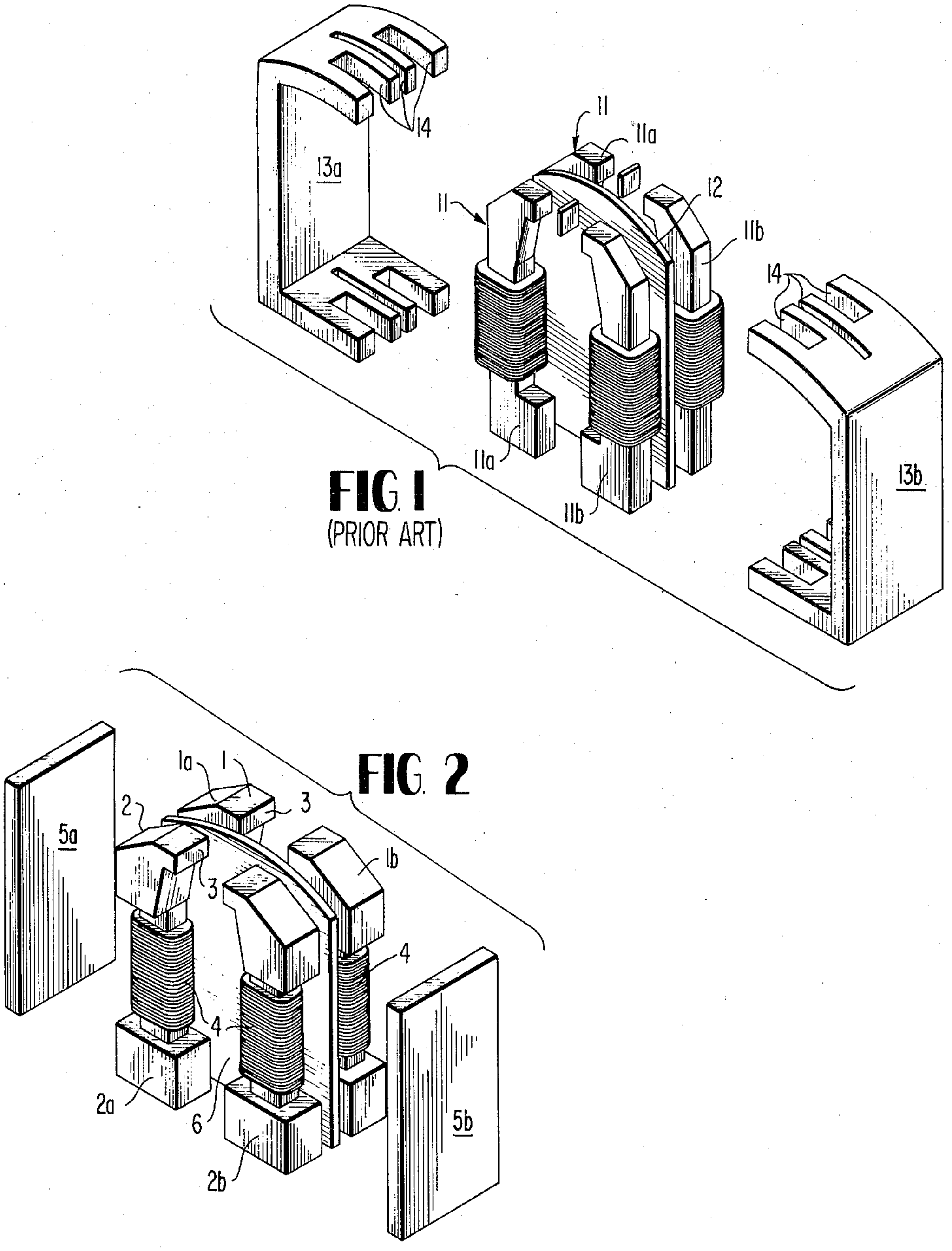
FIG. 1 (PRIOR ART) FIG. 2
FIG. 1 is an exploded, perspective view of a magnetic head obtained by a conventional method.
FIG. 2 is an exploded, perspective view showing essential parts of the magnetic head obtained by the method according to the present invention.

An embodiment of the present invention will now be described for a case of producing a 2-channel magnetic head referring to the drawing.

In FIG. 2, a first core 1 is constituted by a pair of core elements 1*a* and 1*b*, and the second core 2 is constituted by another pair of core elements 2*a* and 2*b*, respectively. Each of the core elements 1*a* and 1*b* has a form made by cutting the core 1 along a plane of the gap surface, and a gap forming layer 3 is provided by means of deposition or sputtering on the gap forming surface to make confronting gap forming surfaces at a predetermined small spacing. Thus, when the core elements 1*a* and 1*b* are opposed, a gap is formed having a predetermined width between both gap forming surfaces, and constitutes the core 1 together with the coil 4 provided thereon. The other core elements 2*a* and 2*b* have substantially the same construction as the core elements 1*a* and 1*b*, so that the similar parts thereof are shown by the same reference number, and the explanation thereof is omitted.

With the method according to the present invention, the core elements 1*a* and 2*a* which are adjacent to each other are secured on the core holder 5*a*, and the remaining core elements 1*b* and 2*b* are secured on the core holder 5*b*, respectively. The core holder 5*a*, which is different from the conventional one used in magnetic head, is in a plate form having a flat surface, and is secured firmly to the core elements 1*a* and 2*a* by means of an adhesive on the surface opposite the gap forming surface so as to consitute the first core element assembly, said core elements 1*a* and 1*b* being so arranged that each of the gap forming surfaces is placed in the same plane utilizing an optical flat or the like. The distance between the core elements l*a* and 2*b* is controlled correctly using a thickness gage, for example, so as to correspond with the distance between tracks. The second core element assembly is constituted by the core elements 1*b*, 2*b* and the core holder 5*b* in the same order as described above.

The first and the second core element assemblies thus obtained are so arranged such that the gap forming surfaces of the core elements 1*a* and 1*b*, and the core elements 2*a* and 2*b* are placed opposite to each other, respectively, and are held using a proper tool (not shown). Then a binder is filled into the gaps formed between each of the cores 1 and 2. This binder comprises an adhesive essentially made of synthetic resin, and globular particles dispersed uniformly in the adhesive. The particles are constituted by a metal oxide such as silica or alumina, or a material having an excellent mechanical strength such as glass, the maximum diameter of the particles is selected equal to or slightly less than half the difference of the distance between the cores 1 and 2 and the thickness of the shield plate 6 inserted between the gap. Taking a 2-channel magnetic head for cassette tape recorder as an example, the distance between the cores 1 and 2 is about 0.3 mm, and the distance between the each of the cores 1, 2 and the shield plate 6 is about 0.05 mm when a shield plate 6 having a thickness of about 0.2 mm is used. Accordingly, in this case, particles having a maximum diameter of about 0.05 – 0.04 mm are used.

Figure 3:
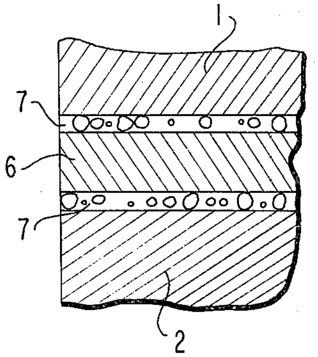
FIG. 3 is a vertical sectional view of a portion of the completed magnetic head of FIG. 2 produced by the method of the present invention.

The shield plate 6 is inserted between the cores 1 and 2 after a binder has been filled therebetween. When the abovestated condition about the particle diameter has been satisfied, each of the particles in the binder make contact between both the cores 1, 2 and the shield plate 6, so that the shield plate 6 penetrates smoothly by the rolling of the particles, and moreover it is placed in a substantially central position between the cores 1 and 2. In FIG. 3, the numeral 7 designates a particle forming a part of the binder. Removing surplus binder in this condition, and causing the binder to settle, a strong bonding can be obtained between each of the core elements 1*a*, 1*b*, 2*a*, 2*b* and the shield plate 6.

As described above, in the present invention each of the core elements can be placed in predetermined relation by means of an optical flat or thickness gage without being restricted by other parameters, whereby an extremely severe standard can be satisfied in the accuracy of the gap as well as the distance between each of the cores. Furthermore, since the positions of each of the cores are controlled without relying upon the core holders, the number of items required for working on the core holders is reduced substantially, and limitation on the material is also released.

What is claimed is:

1. A method for producing a multichannel magnetic head comprising the steps of:

fixing a plurality of similarly cut core elements to a core holder in side to side, spaced positions with each element having a machined gap forming surface facing away from said core holder the relative lateral gap position between the core elements to constitute a first element assembly, forming an identical second core element assembly to that of the first assembly, positioning said first and second core element assemblies in predetermined fixed relative positions with the machined gap forming surfaces facing each other but spaced therefrom at each core element position, filling the spaces between the core elements with a binder comprising an adhesive and globular particles, and inserting a shield plate within the spaces between the side to side spaced core elements, the improvement wherein; the largest diameter of the particles of said binder being equal to the distance between the shield plate and each respective ccre element, and wherein insertion of the shield plate between said core elements is aided by rotation of the particles during penetration of said binder by said shield plate such that said shield plate is automatically centered in each case between respective core elements.

2. The method for producing a multichannel magnetic head as set forth in claim 1, further comprising the step of providing a gap forming layer on said said machined gap forming surface facing away from said core holder by means of sputtering prior to filling the spaces between said core elements with said binder.

3. A method for producing a multichannel magnetic head as set forth in claim 1, wherein said core holder comprises a flat surface plate.

* * * * *